(12) United States Patent
Tanguay et al.

(10) Patent No.: US 9,719,011 B2
(45) Date of Patent: *Aug. 1, 2017

(54) PROPPANT

(75) Inventors: Christopher M. Tanguay, Trenton, MI (US); John Erickson, Southgate, MI (US); Victoria Manea, Bowling Green, OH (US); Jyh-Chiarng Huarng, Northville, MI (US); Rajesh Kumar, Riverview, MI (US); Fikri Emrah Alemdaroglu, Erenkoy Istanbul (TR)

(73) Assignee: BASF SE, Ludwigshafen (DE)

( * ) Notice: Subject to any disclaimer, the term of this patent is extended or adjusted under 35 U.S.C. 154(b) by 936 days.

This patent is subject to a terminal disclaimer.

(21) Appl. No.: 13/126,905

(22) PCT Filed: Oct. 29, 2009

(86) PCT No.: PCT/EP2009/064244
§ 371 (c)(1),
(2), (4) Date: Aug. 17, 2011

(87) PCT Pub. No.: WO2010/049467
PCT Pub. Date: May 6, 2010

(65) Prior Publication Data
US 2011/0297383 A1    Dec. 8, 2011

Related U.S. Application Data

(60) Provisional application No. 61/109,226, filed on Oct. 29, 2008, provisional application No. 61/229,093, filed on Jul. 28, 2009.

(51) Int. Cl.
*E21B 43/26* (2006.01)
*B05D 7/00* (2006.01)
(Continued)

(52) U.S. Cl.
CPC ............... *C09K 8/805* (2013.01); *C09K 8/62* (2013.01)

(58) Field of Classification Search
None
See application file for complete search history.

(56) References Cited

U.S. PATENT DOCUMENTS 2,663,737 A    12/1953  McCormack
2,663,738 A    12/1953  McCormack
(Continued)

FOREIGN PATENT DOCUMENTS

EP    0280971 A1    9/1988
EP    0308257 B1    3/1994
(Continued)

OTHER PUBLICATIONS

Hesselmans et al., "Polycarbodiimide crosslinkers", Progress in Organic Coating 55 (2006), pp. 142-148, The Netherlands.
(Continued)

*Primary Examiner* — Ronak Patel
(74) *Attorney, Agent, or Firm* — Howard & Howard Attorneys PLLC

(57) ABSTRACT

A proppant comprises a particle and a polycarbodiimide coating disposed on the particle. The polycarbodiimide coating comprises the reaction product of a polymeric isocyanate and a monomeric isocyanate, in the presence of a catalyst. A method of forming the proppant comprises the steps of providing the particle, providing the polymeric isocyanate, providing the monomeric isocyanate, providing the catalyst, reacting the polymeric isocyanate and the monomeric isocyanate in the presence of the catalyst to form the polycarbodiimide coating, and coating the particle with the polycarbodiimide coating.

19 Claims, 1 Drawing Sheet

(51) Int. Cl.
*C09K 8/92* (2006.01)
*C09K 8/80* (2006.01)
*C09K 8/62* (2006.01)

(56) References Cited

U.S. PATENT DOCUMENTS

| | | | |
|---|---|---|---|
| 2,853,473 A | 9/1958 | Campbell et al. |
| 3,056,835 A | 10/1962 | Monagle, Jr. et al. |
| 3,152,131 A | 10/1964 | Heberling, Jr. |
| 3,384,653 A | 5/1968 | Erner et al. |
| 3,406,197 A | 10/1968 | Ulrich |
| 3,406,198 A | 10/1968 | Budnick |
| 3,522,303 A | 7/1970 | Ulrich |
| 3,607,365 A | 9/1971 | Lindlof |
| 3,878,686 A | 4/1975 | Hageman et al. |
| 3,976,135 A | 8/1976 | Anderson |
| 4,042,032 A | 8/1977 | Anderson et al. |
| 4,070,865 A | 1/1978 | McLaughlin |
| 4,074,760 A | 2/1978 | Copeland et al. |
| 4,105,642 A | 8/1978 | Smith |
| 4,105,643 A | 8/1978 | Smith |
| 4,113,014 A | 9/1978 | Kubens et al. |
| 4,114,382 A | 9/1978 | Kubens et al. |
| 4,118,536 A | 10/1978 | Beardsley et al. |
| 4,139,676 A | 2/1979 | Janssen et al. |
| 4,143,063 A | 3/1979 | Alberino et al. |
| 4,284,730 A | 8/1981 | Narayan et al. |
| 4,426,467 A | 1/1984 | Quist et al. |
| 4,439,489 A | 3/1984 | Johnson et al. |
| 4,474,852 A | 10/1984 | Craig |
| 4,581,253 A | 4/1986 | Evans et al. |
| 4,585,064 A | 4/1986 | Graham et al. |
| 4,694,905 A | 9/1987 | Armbruster |
| 4,785,884 A | 11/1988 | Armbruster |
| 4,920,192 A | 4/1990 | Wiser-Halladay |
| 5,048,608 A | 9/1991 | Wiser-Halladay et al. |
| 5,058,676 A | 10/1991 | Fitzpatrick et al. |
| 5,199,491 A | 4/1993 | Kutta et al. |
| 5,373,901 A | 12/1994 | Norman et al. |
| 5,604,186 A | 2/1997 | Hunt et al. |
| 5,733,952 A | 3/1998 | Geoffrey |
| 5,791,415 A | 8/1998 | Nguyen et al. |
| 6,059,034 A | 5/2000 | Rickards et al. |
| 6,063,890 A | 5/2000 | Tye |
| 6,079,492 A | 6/2000 | Hoogteijling et al. |
| 6,330,916 B1 | 12/2001 | Rickards et al. |
| 6,364,018 B1 | 4/2002 | Brannon et al. |
| 6,439,309 B1 | 8/2002 | Matherly et al. |
| 6,444,316 B1 | 9/2002 | Reddy et al. |
| 6,492,484 B2 | 12/2002 | Misumi et al. |
| 6,508,305 B1 | 1/2003 | Brannon et al. |
| 6,527,051 B1 | 3/2003 | Reddy et al. |
| 6,554,071 B1 | 4/2003 | Reddy et al. |
| 6,555,228 B2 | 4/2003 | Guritza |
| 6,582,819 B2 | 6/2003 | McDaniel et al. |
| 6,632,527 B1 | 10/2003 | McDaniel et al. |
| 6,722,434 B2 | 4/2004 | Reddy et al. |
| 6,749,025 B1 | 6/2004 | Brannon et al. |
| 6,765,034 B2 * | 7/2004 | Nishida et al. ............... 521/170 |
| 6,772,838 B2 | 8/2004 | Dawson et al. |
| 6,818,594 B1 | 11/2004 | Freeman et al. |
| 6,832,650 B2 | 12/2004 | Nguyen et al. |
| 6,851,474 B2 | 2/2005 | Nguyen |
| 6,866,934 B2 | 3/2005 | Takahashi et al. |
| 6,962,200 B2 | 11/2005 | Nguyen et al. |
| 6,992,048 B2 | 1/2006 | Reddy et al. |
| 7,000,701 B2 | 2/2006 | Todd et al. |
| 7,017,665 B2 | 3/2006 | Nguyen |
| 7,059,406 B2 | 6/2006 | Nguyen |
| 7,063,151 B2 | 6/2006 | Nguyen et al. |
| 7,073,581 B2 | 7/2006 | Nguyen et al. |
| 7,093,658 B2 | 8/2006 | Chatterji et al. |
| 7,094,815 B2 | 8/2006 | Lin et al. |
| 7,114,570 B2 | 10/2006 | Nguyen et al. |
| 7,131,491 B2 | 11/2006 | Blauch et al. |
| 7,135,231 B1 | 11/2006 | Sinclair et al. |
| 7,153,575 B2 | 12/2006 | Anderson et al. |
| 7,156,194 B2 | 1/2007 | Nguyen |
| 7,179,485 B1 | 2/2007 | Schneider et al. |
| 7,258,921 B2 | 8/2007 | Hashiba et al. |
| 7,262,154 B2 | 8/2007 | Griffin et al. |
| 2001/0011114 A1* | 8/2001 | Uebayashi et al. ........... 524/195 |
| 2005/0126781 A1 | 6/2005 | Reddy et al. |
| 2005/0130845 A1 | 6/2005 | Freeman et al. |
| 2005/0271875 A1* | 12/2005 | Hashiba et al. .............. 428/403 |
| 2006/0175059 A1 | 8/2006 | Sinclair et al. |
| 2007/0155938 A1* | 7/2007 | Wershofen et al. ............ 528/44 |
| 2007/0204992 A1 | 9/2007 | Davis et al. |
| 2008/0161554 A1 | 7/2008 | Dai et al. |
| 2008/0230223 A1* | 9/2008 | McCrary .................. C09D 5/03 166/272.2 |
| 2009/0098431 A1 | 4/2009 | Yasumura et al. |
| 2009/0238988 A1* | 9/2009 | McDaniel et al. ............ 427/487 |
| 2009/0306332 A1 | 12/2009 | Kray et al. |
| 2010/0087566 A1 | 4/2010 | Ballard |

FOREIGN PATENT DOCUMENTS

| | | |
|---|---|---|
| EP | 0643197 A3 | 3/1995 |
| EP | 0769338 A1 | 4/1997 |
| EP | 1152121 A2 | 11/2001 |
| EP | 1344795 A2 | 9/2003 |
| EP | 1528077 A1 | 5/2005 |
| WO | WO 01/34939 A1 | 5/2001 |
| WO | WO 01/64603 A1 | 9/2001 |
| WO | WO 03/102107 A1 | 12/2003 |
| WO | WO 2005/049962 A2 | 6/2005 |
| WO | WO 2006/088603 A1 | 8/2006 |
| WO | WO 2008/134359 A1 | 11/2008 |
| WO | WO 2009/006253 A2 | 1/2009 |
| WO | WO 2009/091909 A2 | 7/2009 |
| WO | WO 2010/049467 A1 | 5/2010 |

OTHER PUBLICATIONS

International Search Report for Application No. PCT/EP2009/064244 dated Mar. 23, 2010, 6 pages.

* cited by examiner

PROPPANT

RELATED APPLICATIONS

This application claims priority to and all the advantages of International Patent Application No. PCT/EP2009/064244, filed on Oct. 29, 2009, which claims priority to U.S. Provisional Patent Application Nos. 61/109,226 and 61/229,093, filed on Oct. 29, 2008 and Jul. 28, 2009, respectively.

FIELD OF THE INVENTION

The subject invention generally relates to a proppant and a method of forming the proppant. More specifically, the subject invention relates to a proppant which comprises a particle and a coating disposed on the particle, and which is used during hydraulic fracturing of a subterranean formation.

DESCRIPTION OF THE RELATED ART

Domestic energy needs in the United States currently outpace readily accessible energy resources, which has forced an increasing dependence on foreign petroleum fuels, such as oil and gas. At the same time, existing United States energy resources are significantly underutilized, in part due to inefficient oil and gas procurement methods and a deterioration in the quality of raw materials such as unrefined petroleum fuels.

Petroleum fuels are typically procured from subsurface reservoirs via a wellbore. Petroleum fuels are currently procured from low-permeability reservoirs through hydraulic fracturing of subterranean formations, such as bodies of rock having varying degrees of porosity and permeability. Hydraulic fracturing enhances production by creating fractures that emanate from the subsurface reservoir or wellbore, and provides increased flow channels for petroleum fuels. During hydraulic fracturing, specially-engineered carrier fluids are pumped at high pressure and velocity into the subsurface reservoir to cause fractures in the subterranean formations. A propping agent, i.e., a proppant, is mixed with the carrier fluids to keep the fractures open when hydraulic fracturing is complete. The proppant typically comprises a particle and a coating disposed on the particle. The proppant remains in place in the fractures once the high pressure is removed, and thereby props open the fractures to enhance petroleum fuel flow into the wellbore. Consequently, the proppant increases procurement of petroleum fuel by creating a high-permeability, supported channel through which the petroleum fuel can flow.

However, many existing proppants exhibit inadequate thermal stability for high temperature and pressure applications, e.g. wellbores and subsurface reservoirs having temperatures greater than 70° F. and pressures, i.e., closure stresses, greater than 7,500 psi. That is, many existing proppants comprise coatings, such as epoxy or phenolic coatings, that break down or shear off the particle in an uncontrolled manner when exposed to such high temperatures and pressures. Also, many existing proppants do not include active agents, such as microorganisms and catalysts, to improve the quality of the petroleum fuel recovered from the subsurface reservoir.

Further, many existing proppants comprise coatings having inadequate crush resistance. That is, many existing proppants comprise non-uniform coatings that include defects, such as gaps or indentations, which contribute to premature breakdown and/or failure of the coating. Since the coating typically provides a cushioning effect for the proppant and evenly distributes high pressures around the proppant, premature breakdown and/or failure of the coating undermines the crush resistance of the proppant. Crushed proppants cannot effectively prop open fractures and often contribute to impurities in unrefined petroleum fuels in the form of dust particles.

Moreover, many existing proppants also exhibit unpredictable consolidation patterns and suffer from inadequate permeability in wellbores, i.e., the extent to which the proppant allows the flow of petroleum fuels. That is, many existing proppants have a lower permeability and impede petroleum fuel flow. Further, many existing proppants consolidate into aggregated, near-solid, non-permeable proppant packs and prevent adequate flow and procurement of petroleum fuels from subsurface reservoirs.

Also, many existing proppants are not compatible with low-viscosity carrier fluids having viscosities of less than about 3,000 cps at 80° C. Low-viscosity carrier fluids are typically pumped into wellbores at higher pressures than high-viscosity carrier fluids to ensure proper fracturing of the subterranean formation. Consequently, many existing coatings fail mechanically, i.e., shear off the particle, when exposed to high pressures or react chemically with low-viscosity carrier fluids and degrade.

Finally, many existing proppants are coated via noneconomical coating processes and therefore contribute to increased production costs. That is, many existing proppants require multiple layers of coatings, which results in time-consuming and expensive coating processes.

Due to the inadequacies of existing proppants, there remains an opportunity to provide an improved proppant.

SUMMARY OF THE INVENTION AND ADVANTAGES

The subject invention provides a proppant for hydraulically fracturing a subterranean formation. The proppant comprises a particle and a coating, typically a polycarbodiimide coating, disposed on the particle. The subject invention also provides a method of forming the proppant comprising the particle and the polycarbodiimide coating disposed on the particle. The method comprises the steps of providing the particle, providing the polycarbodiimide coating, and coating the particle with the polycarbodiimide coating. A method of hydraulically fracturing a subterranean formation is also provided.

Advantageously, the proppant of the subject invention improves upon the performance of existing proppants. The performance of the proppant is attributable to the polycarbodiimide coating. In addition, the proppant of the subject invention is formed efficiently, requiring few resources.

BRIEF DESCRIPTION OF THE DRAWING

Other advantages of the present invention will be readily appreciated, as the same becomes better understood by reference to the following detailed description when considered in connection with the accompanying drawing wherein:

FIG. 1 is a graph illustrating the chemical composition of various mixtures of monomeric isocyanate (LUPRANATE® M) and polymeric isocyanate (LUPRANATE® M20).

DETAILED DESCRIPTION OF THE INVENTION

The subject invention includes a proppant, a method of forming, or preparing, the proppant, a method of hydraulically fracturing a subterranean formation, and a method of filtering a fluid. The proppant is typically used, in conjunction with a carrier fluid, to hydraulically fracture the subterranean formation which defines a subsurface reservoir (e.g. a wellbore or reservoir itself). Here, the proppant props open the fractures in the subterranean formation after the hydraulic fracturing. In one embodiment, the proppant may also be used to filter unrefined petroleum fuels, e.g. crude oil, in fractures to improve feedstock quality for refineries. However, it is to be appreciated that the proppant of the subject invention can also have applications beyond hydraulic fracturing and crude oil filtration, including, but not limited to, water filtration and artificial turf.

The proppant comprises a particle and a coating disposed on the particle. The coating is described additionally below. Although the particle may be of any size, the particle typically has a particle size distribution of from 10 to 100 mesh, more typically 20 to 70 mesh, as measured in accordance with standard sizing techniques using the United States Sieve Series. That is, the particle typically has a particle size of from 149 to 2,000, more typically of from 210 to 841, µm. Particles having such particle sizes allow less coating to be used, allow the coating to be applied to the particle at a lower viscosity, and allow the coating to be disposed on the particle with increased uniformity and completeness as compared to particles having other particle sizes.

Although the shape of the particle is not critical, particles having a spherical shape typically impart a smaller increase in viscosity to a hydraulic fracturing composition than particles having other shapes, as set forth in more detail below. The hydraulic fracturing composition is a mixture comprising the carrier fluid and the proppant. Typically, the particle is either round or roughly spherical.

The particle typically contains less than 1 part by weight of moisture, based on 100 parts by weight of the particle. Particles containing higher than 1 part by weight of moisture typically interfere with sizing techniques and prevent uniform coating of the particle.

Suitable particles for purposes of the subject invention include any known particle for use during hydraulic fracturing, water filtration, or artificial turf preparation. Non-limiting examples of suitable particles include minerals, ceramics such as sintered ceramic particles, sands, nut shells, gravels, mine tailings, coal ashes, rocks, smelter slag, diatomaceous earth, crushed charcoals, micas, sawdust, wood chips, resinous particles, polymeric particles, and combinations thereof.

Sand is a preferred particle and when applied in this technology is commonly referred to as frac, or fracturing, sand. Examples of suitable sands include, but are not limited to, Arizona sand, Wisconsin sand, Brady sand, and Ottawa sand. It is to be appreciated that other particles not recited herein may also be suitable for the purposes of the subject invention. Based on cost and availability, inorganic materials such as sand and sintered ceramic particles are typically favored for applications not requiring filtration.

A specific example of a sand that is suitable as a particle for the purposes of the subject invention is Arizona sand. Arizona sand is commercially available from BASF Corporation of Florham Park, N.J. Arizona sand is a natural grain that is derived from weathering and erosion of preexisting rocks. This sand is typically coarse and is roughly spherical. Another suitable sand for the purposes of this invention is Ottawa sand, commercially available from U.S. Silica Company of Berkeley Springs, W. Va. A particularly preferred Arizona sand for application in this invention is size 20/40 Arizona sand, and a particularly preferred Ottawa sand is size 40/70 Ottawa sand.

Specific examples of suitable sintered ceramic particles include, but are not limited to, aluminum oxide, silica, bauxite, and combinations thereof. The sintered ceramic particle may also include clay-like binders.

An active agent may also be included in the particle. In this context, suitable active agents include, but are not limited to, organic compounds, microorganisms, and catalysts. Specific examples of microorganisms include, but are not limited to, anaerobic microorganisms, aerobic microorganisms, and combinations thereof. A suitable microorganism for the purposes of the subject invention is commercially available from LUCA Technologies of Golden, Colo. Specific examples of suitable catalysts include fluid catalytic cracking catalysts, hydroprocessing catalysts, and combinations thereof. Fluid catalytic cracking catalysts are typically selected for applications requiring petroleum gas and/or gasoline production from crude oil. Hydroprocessing catalysts are typically selected for applications requiring gasoline and/or kerosene production from crude oil. It is also to be appreciated that other catalysts, organic or inorganic, not recited herein may also be suitable for the purposes of the subject invention.

Such additional active agents are typically favored for applications requiring filtration. As one example, sands and sintered ceramic particles are typically useful as a particle for support and propping open fractures in the subterranean formation which defines the subsurface reservoir, and, as an active agent, microorganisms and catalysts are typically useful for removing impurities from crude oil or water. Therefore, a combination of sands/sintered ceramic particles and microorganisms/catalysts as active agents are particularly preferred for crude oil or water filtration.

Suitable particles for purposes of the present invention may even be formed from resins and polymers. Specific examples of resins and polymers for the particle include, but are not limited to, polyurethanes, polycarbodiimides, polyureas, acrylics, polyvinylpyrrolidones, acrrylonitrile-butadiene styrenes, polystyrenes, polyvinyl chlorides, fluoroplastics, polysulfides, nylon, and combinations thereof.

As indicated above, the proppant also includes the coating. The coating typically provides the particle with protection from operating temperatures and pressures in the subterranean formation and/or subsurface reservoir. Further, the coating typically protects the particle against closure stresses exerted by the subterranean formation. The coating also typically protects the particle from ambient conditions and minimizes disintegration and/or dusting of the particle. In some embodiments, the coating may also provide the proppant with desired chemical reactivity and/or filtration capability. As set forth above, the coating is disposed on the particle. As used herein, the terminology "disposed on" encompasses "disposed about" the particle and also both partial and complete covering of the particle by the coating.

The coating is typically selected from the group of polyurethane coatings, polyurea coatings, polycarbodiimide coatings, formaldehyde-based coatings, and combinations thereof. Preferably, the coating is a polycarbodiimide coating. However, it is to be appreciated that other coatings not recited herein may also be suitable for the purposes of the subject invention. The coating is typically selected based on the desired properties and expected operating conditions of the proppant.

In one embodiment, the coating is a polyurethane coating. Polyurethane coatings are typically selected for lower temperature and pressure applications, e.g. applications requiring temperatures of less than 123° C. and pressures of less than 7,500 psi. Polyurethane coatings are also typically advantageous based on cost as compared to other coating selections.

The polyurethane coating comprises a reaction product of an isocyanate component and an isocyanate-reactive component. Suitable isocyanate components include any known in the art. However, the isocyanate component is typically selected from the group of monomeric diphenylmethane diisocyanate (MMDI), polymeric MDI (pMDI), carbodiimide-modified MDI, toluene diisocyanate (TDI), and combinations thereof. One skilled in the art typically selects the isocyanate component based on economics and suitability. For example, pMDIs typically offer high crosslink density and moderate viscosity. Alternatively, MMDIs and TDIs typically offer low viscosity and high NCO content with low nominal functionality. The isocyanate component is commercially available from BASF Corporation of Florham Park, N.J., under the trade name Lupranate®.

The isocyanate component typically has a viscosity of from 1 to 3,000, more typically from 20 to 700, and most typically from 50-300 cps at 25° C. to allow adequate mixing and to allow the isocyanate component to be ideally applied, such as by spraying, to the particle. Further, the isocyanate component typically has a nominal functionality of from 1 to 5, more typically from 1.5 to 4, and most typically from 2.0 to 2.7 to allow for effective reaction of the isocyanate component with the isocyanate-reactive component. Typically, the isocyanate component has an NCO content of from 20% to 50%, more typically from 25% to 40%, and most typically from 30% to 33% to provide excellent molecular crosslink density of the isocyanate component to aid in the formation of the polyurethane coating. The aforementioned NCO content also provides the isocyanate component with optimized chemical bonds per unit of mass to improve cost efficiency.

The isocyanate-reactive component may include a polyamine, but more commonly includes a polyol. In one embodiment, the polyol is derived from a dipropylene glycol initiator. In another embodiment, the polyol is derived from an aromatic amine-based initiator and includes alkylene oxide substituents. Examples of suitable alkylene oxides for said substituents include, but are not limited to, ethylene oxide, propylene oxide, butylene oxide, amylene oxide, alkylene oxide-tetrahydrofuran mixtures, epihalohydrins, and aralkylene styrene, and combinations thereof. Examples of aromatic amine-based initiators that are suitable for the subject invention include, but are not limited to, compounds having the general structure:

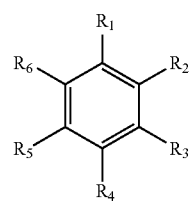

wherein $R_1$ includes one of an alkyl group, an amine group, and a hydrogen, and each of $R_2$-$R_6$ independently include one of an amine group and a hydrogen, so long as at least one of $R_1$-$R_6$ is an amine group. As recited herein, the terminology "amine group" refers to R—N—H and $NH_2$. Therefore, it is to be appreciated that $R_1$ can be any one of an alkyl group, an amine group, or hydrogen, or any compound including combinations thereof. It is also to be appreciated that $R_2$-$R_6$ are not necessarily identical and each can include an amine group or hydrogen.

The aromatic amine-based initiator may include a toluene diamine represented by the following structures:

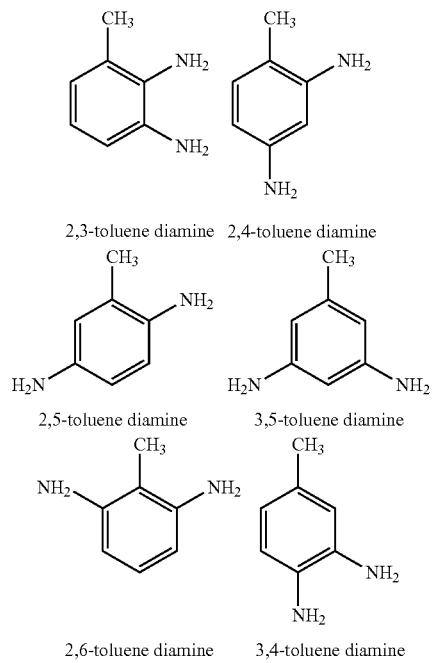

2,3-toluene diamine   2,4-toluene diamine 2,5-toluene diamine   3,5-toluene diamine 2,6-toluene diamine   3,4-toluene diamine That is, the toluene diamine includes, but is not limited to, 2,3-toluenediamine, 2,4-toluenediamine, 2,5-toluenediamine, 2,6-toluenediamine, 3,4-toluenediamine, 3,5-toluenediamine, and mixtures thereof.

The polyol typically has a viscosity from 50 to 20,000, more typically from 5,000 to 17,000, and most typically from 10,000 to 15,000 cps at 25° C. to allow the polyol to be sprayed onto the particle. The polyol can be stored at and heated in the temperature range of from 60 to 80° F. The polyol also typically has a nominal functionality from 1 to 7, more typically from 2 to 6, and most typically from 2 to 4 to allow for effective reaction of the polyol with the isocyanate component and to reduce the cost of the polyol. Typically, the polyol has an OH number from 15 to 1000, more typically from 300 to 600, even more typically from 350 to 500, and most typically from 380 to 450 to maximize crosslinking density of the polyurethane coating.

In particular, in one embodiment, the polyol is an amine-initiated polyether polyol. In another embodiment, the polyol is a trifunctional alcohol-initiated polyether polyol. It is also to be appreciated that the isocyanate-reactive component may comprise more than one polyol. Suitable polyols are commercially available from BASF Corporation of Florham Park, N.J., under the trade name Pluracol®.

The isocyanate-reactive component may also include a cross-linker. The cross-linker typically couples polymer chains in the polyurethane coating. Therefore, the cross-linker is typically present in the isocyanate-reactive component to modify the hardness and reduce shrinkage of the polyurethane coating. The cross-linker typically has a hydroxyl number of from 800 to 1,200 mg KOH/g. Suitable cross-linkers include any cross-linker known in the art such as, for example, diethylene glycol and diethanolamine in water.

The isocyanate-reactive component may further comprise an additive component. Suitable additive components include, but are not limited to, surfactants, blowing agents, blocking agents, dyes, pigments, diluents, solvents, specialized functional additives such as antioxidants, ultraviolet stabilizers, biocides, adhesion promoters, antistatic agents, fire retardants, fragrances, and combinations of the group. For example, a pigment allows the coating to be visually evaluated for thickness and integrity and can provide various marketing advantages. Also, physical blowing agents and chemical blowing agents are typically selected for polyurethane coatings requiring foaming. That is, in one embodiment, the coating may comprise a foam coating disposed on the particle. Again, it is to be understood that the terminology "disposed on" encompasses both partial and complete covering of the particle by the coating, a foam coating in this instance. The foam coating is typically useful for applications requiring enhanced contact between the proppant and crude oil. That is, the foam coating typically defines microchannels and increases a surface area for contact between crude oil and the catalyst and/or microorganism. The foam coating is typically selected from the group of polyurethane foam coatings, polyurea foam coatings, and combinations thereof. In one embodiment, the coating disposed on the particle is a polyurethane foam coating.

A surfactant is typically present as or in the additive component for applications including the polyurethane foam coating. In such embodiments, the surfactant is typically present to control cell structure and improve stability of the polyurethane foam coating and to improve miscibility of components. Suitable surfactants include any surfactant known in the art, such as silicones and nonylphenol ethoxylates. Typically, the surfactant is a silicone that is selected according to the reactivity of the polyol.

A blowing agent is typically present in the additive component of the isocyanate-reactive component to facilitate the formation of the polyurethane foam coating. That is, as is known in the art, during a polyurethane foaming reaction between the isocyanate component and the isocyanate-reactive component, the blowing agent promotes the release of a blowing gas which forms cell voids in the polyurethane foam coating. The blowing agent may be a physical blowing agent or a chemical blowing agent.

The terminology "physical blowing agent" refers to blowing agents that do not chemically react with the isocyanate component and/or the isocyanate-reactive component to provide a blowing gas. The physical blowing agent can be a gas or liquid. The liquid physical blowing agent typically evaporates into a gas when heated, and typically returns to a liquid when cooled. The physical blowing agent typically reduces the thermal conductivity of the polyurethane foam coating. Suitable physical blowing agents for the purposes of the subject invention may include hydrofluorocarbons (HFCs), hydrocarbons, and combinations thereof. The most typical physical blowing agents typically have a zero ozone depletion potential.

The terminology "chemical blowing agent" refers to blowing agents which chemically react with the isocyanate component or with other components to release a gas for foaming. Examples of chemical blowing agents that are suitable for the purposes of the subject invention include formic acid, water, and combinations thereof. A specific example of a blowing agent that is suitable for the purposes of the present invention is water.

The additive component of the isocyanate-reactive component may also include a blocking agent. The blocking agent is typically present in the additive component to delay cream time and increase cure time of the polyurethane foam coating. Suitable blocking agents are typically selected according to the reactivity of the isocyanate component. Typically, the blocking agent is a polymeric acid, i.e., a polymer with repeating units and multiple acid-functional groups.

The isocyanate-reactive component typically further comprises a catalyst component. The catalyst component is typically present in the isocyanate-reactive component to catalyze the polyurethane foaming reaction between the isocyanate component and the isocyanate-reactive component. It is to be appreciated that the catalyst component is typically not consumed in the polyurethane foaming reaction between the isocyanate component and the isocyanate-reactive component. That is, the catalyst component typically participates in, but is not consumed by the flexible polyurethane foaming reaction. The catalyst component may include any suitable catalyst or mixtures of catalysts known in the art. Examples of suitable catalysts include, but are not limited to, gelation catalysts, e.g. crystalline catalysts in dipropylene glycol; blowing catalysts, e.g. bis(dimethylaminoethyl)ether in dipropylene glycol; and tin catalysts, e.g. tin octoate.

In another embodiment, the coating is polyurea coating. Polyurea coatings are typically selected for higher temperature and pressure applications, for example when the proppant is exposed to temperatures greater than 123° C. and to pressures greater than 7,500 psi.

The polyurea coating comprises a reaction product of the isocyanate component and an amine. The amine may include any amine known in the art. The amine typically includes, but is not limited to, primary and secondary amines, aliphatic, and/or cyclic aliphatic amines. The amine may include any additional functional group known in the art including, but not limited to, hydroxyl groups, thiol groups, alkyl groups, cyclic groups, aromatic groups, and combinations thereof. It is to be understood that the amine may also include an amide. If the amine includes the amide, the amide may be any type known in the art. Typically the amide includes, but is not limited to, polyester amides obtained from polymers of unsaturated or saturated carboxylic acids or anhydrides, multifunctional unsaturated or saturated aminoalcohols, and combinations thereof. In all embodiments of the subject invention, it is contemplated that any amine or amide known in the art may be utilized.

Specific examples of suitable amines include, but are not limited to, diethyltoluenediamine; aromatic diamines such as N,N'-Bis(1-methylpropyl)-1,4-benzenediamine and 4,4'-Bis(sec-butylamine)diphenylmethane; polyether diamines; ethylenediamine; isophorone diamines; methane diamines such as 4,4'-dicyclohexyl methane diamine and 4,4'-dimethylcyclohexyl methane diamine; amino-terminated polyoxypropylene glycol; and amino-terminated glycerine propoxylate.

It is to be appreciated that the polyurea coating may also comprise the reaction product of the isocyanate component, the amine, and the additive component set forth above. For example, in one embodiment, the polyurea coating is further defined as a polyurea foam coating and comprises a physical and/or chemical blowing agent.

In a preferred embodiment, the coating is a polycarbodiimide coating. The polycarbodiimide coating is typically selected for applications requiring excellent coating stability and adhesion to the particle. As one example, the polycarbodiimide coating is particularly applicable when the proppant is exposed to significant compression and/or shear forces, and temperatures exceeding 500° F. in the subterranean formation and/or subsurface reservoir defined by the formation. The polycarbodiimide coating is generally viscous to solid nature, and depending on molecular weight, is typically sparingly soluble or insoluble in organic solvents. Any suitable polycarbodiimide coating may be used for the purposes of the subject invention.

Typically, the polycarbodiimide coating is formed by reacting an isocyanate in the presence of a catalyst. The polycarbodiimide coating can be the reaction product of one type of isocyanate. However, for this invention, the polycarbodiimide coating is preferably the reaction product of at least two different isocyanates such that the isocyanate introduced above is defined as a first isocyanate and a second isocyanate that is different from the first isocyanate. Obviously, the polycarbodiimide coating may be the reaction product of more than two isocyanates.

The isocyanate may be any type of isocyanate known to those skilled in the art. The isocyanate may be a polyisocyanate having two or more functional groups, e.g. two or more NCO functional groups. Suitable isocyanates for purposes of the present invention include, but are not limited to, aliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanate may be an isocyanate prepolymer. The isocyanate prepolymer is typically a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Specific isocyanates that may be used to prepare the polycarbodiimide coating include, but are not limited to, toluylene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisopropyl-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate. Other suitable polycarbodiimide coatings can also be prepared from aromatic diisocyanates or isocyanates having one or two aryl, alkyl, arakyl or alkoxy substituents wherein at least one of these substituents has at least two carbon atoms. Specific examples of suitable isocyanates include LUPRANATE® L5120, LUPRANATE® M, LUPRANATE® ME, LUPRANATE® MI, LUPRANATE® M20, and LUPRANATE® M70, all commercially available from BASF Corporation of Florham Park, N.J.

As indicated above, multiple isocyanates may be reacted to form the polycarbodiimide coating. When one or more isocyanates are reacted to form the polycarbodiimide coating, the physical properties of the polycarbodiimide coating, such as hardness, strength, toughness, creep, and brittleness can be further optimized and balanced.

In a particularly preferred embodiment, the first isocyanate is further defined as a polymeric isocyanate, and the second isocyanate is further defined as a monomeric isocyanate. As such, a mixture of LUPRANATE® M20 and LUPRANATE® M may be reacted to form the polycarbodiimide coating. LUPRANATE® M20 comprises polymeric isocyanates, such as polymeric diphenyl methane diisocyanate, and also comprises monomeric isocyanates. LUPRANATE® M comprises only monomeric isocyanates. As is known in the art, a monomeric isocyanate includes, but is not limited to, 2,4'-diphenylmethane diisocyanate (2,4'-MDI) and 4,4'-diphenylmethane diisocyanate (4,4'-MDI). As is also well know in the art, polymeric isocyanate includes isocyanates with two or more aromatic rings. Various mixtures of LUPRANATE® M and LUPRANATE® M20 are illustrated in FIG. 1. LUPRANATE® M20 has an NCO content of about 31.5 weight percent and LUPRANATE® M has an NCO content of about 33.5 weight percent.

Increasing an amount of LUPRANATE® M20 in the mixture increases the amount of polymeric MDI in the mixture, and increasing the amount of polymeric MDI in the mixture affects the physical properties of the polycarbodiimide coating. For example, in one embodiment, a mixture of LUPRANATE® M20 and LUPRANATE® M is reacted to form the polycarbodiimide coating. Generally, increasing an amount of LUPRANATE® M20 and decreasing an amount of LUPRANATE® M in the mixture forms a polycarbodiimide coating which is harder, stronger, and does not creep significantly; however, the polycarbodiimide coating may also be brittle. Likewise, decreasing the amount of LUPRANATE® M20 and increasing the amount of LUPRANATE® M in the mixture generally decreases the brittleness but increases the creep of the polycarbodiimide coating.

In a particularly preferred embodiment, the polymeric isocyanate, such as LUPRANATE® M20, is typically reacted in an amount of from about 20 to about 100, more typically from about 40 to about 80, most typically from about 60 to about 70, percent by weight and the monomeric isocyanate, such as LUPRANATE® M, is typically reacted in an amount of from about 20 to about 80, more typically from about 25 to about 60, most typically from about 30 to about 40, percent by weight, both based on a total combined weight of the polymeric and monomeric isocyanates. In yet another preferred embodiment, the polymeric isocyanate and the monomeric isocyanate react in a weight ratio of 4:1 to 1:4, more typically 2.5:1 to 1:1, and even more typically 2.0:1, to form the polycarbodiimide coating.

The one or more isocyanates are typically heated in the presence of the catalyst to form the polycarbodiimide coating. The catalyst may be any type of catalyst known to those skilled in the art. Generally, the catalyst is selected from the group of phosphorous compounds, tertiary amides, basic metal compounds, carboxylic acid metal salts, non-basic organo-metallic compounds, and combinations thereof. For example, the one or more isocyanates may be heated in the presence of a phosphorous compound to form the polycarbodiimide coating. Suitable examples of the phosphorous compound include, but are not limited to, phospholene oxides such as 3-methyl-1-phenyl-2-phospholene oxide, 1-phenyl-2-phospholen-1-oxide, 3-methyl-1-2-phospholen-1-oxide, 1-ethyl-2-phospholen-1-oxide, 3-methyl-1-phenyl-2-phospholen-1-oxide, and 3-phospholene isomers thereof. A particularly suitable phospholene oxide is 3-methyl-1-phenyl-2-phospholene oxide, represented by the following structure:

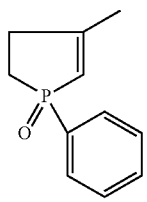

In a particularly preferred embodiment, 3-methyl-1-phenyl-2-phospholene oxide is typically present in the polycarbodiimide coating in an amount of from greater than about 1 to about 1000 PPM, more typically of from about 2 to about 750 PPM, and most typically of from about 3 to about 500 PPM.

Specific polycarbodiimide coatings which are suitable for the purposes of the subject invention include, but are not limited to, monomers, oligomers, and polymers of diisopropylcarbodiimide, dicyclohexylcabodiimide, methyl-tert-butylcarbodiimide, 2,6-diethylphenyl carbodiimide; di-ortho-tolyl-carbodimide; 2,2'-dimethyl diphenyl carbodiimide; 2,2'-diisopropyl-diphenyl carbodiimide; 2-dodecyl-2'-n-propyl-diphenylcarbodiimide; 2,2'-diethoxy-diphenyl dichloro-diphenyl carbodiimide; 2,2'-ditolyl-diphenyl carbodiimide; 2,2'-dibenzyl-diphenyl carbodiimide; 2,2'-dinitro-diphenyl carbodiimide; 2-ethyl-2'-isopropyl-diphenyl carbodiimide; 2,6,2',6'-tetraethyl-diphenyl carbodiimide; 2,6,2',6'-tetrasecondary-butyl-diphenyl carbodiimide; 2,6,2',6'-tetraethyl-3,3'-dichloro-diphenyl carbodiimide; 2-ethyl-cyclohexyl-2-isopropylphenyl carbodiimide; 2,4,6,2',4',6'-hexaisopropyl-diphenyl carbodiimide; 2,2'-diethyl-dicyclo hexyl carbodiimide; 2,6,2',6'-tetraisopropyl-dicyclo hexyl carbodiimide; 2,6,2',6' tetraethyl-dicyclo hexy) carbodiimide and 2,2'-dichlorodicyclohexyl carbodiimide; 2,2'-dicarbethoxy diphenyl carbodiimide; 2,2'-dicyano-diphenyl carbodiimide and the like.

The polycarbodiimide coating is typically present in the proppant in an amount of from about 0.1 to about 10, more typically of from about 0.5 to about 7.5, and most typically of from about 1.0 to about 6.0, percent by weight based on 100 parts by weight of the particle.

The polycarbodiimide coating may be formed in-situ where the polycarbodiimide coating is disposed on the particle during formation of the polycarbodiimide coating. Said differently, the components of the polycarbodiimide coating are typically combined with the particle and the polycarbodiimide coating is disposed on the particle.

However, in one embodiment a polycarbodiimide coating is formed and some time later applied to, e.g. mixed with, the particle and exposed to temperatures exceeding 100° C. to coat the particle and form the proppant. Advantageously, this embodiment allows the polycarbodiimide coating to be formed at a location designed to handle chemicals, under the control of personnel experienced in handling chemicals.

Once formed, the polycarbodiimide coating can be transported to another location, applied to the particle, and heated. Other advantages of this embodiment include quicker sand coating cycle times, less generation of $CO_2$ during coating of the particle, and reduced use of the catalyst. In addition to the advantages described above, there are numerous logistical and practical advantages associated with this embodiment. For example, if the polycarbodiimide coating is being applied to the particle, e.g. frac sand, the polycarbodiimide coating may be applied immediately following the manufacturing of the frac sand, when the frac sand is already at elevated temperature, eliminating the need to reheat the polycarbodiimide coating and the frac sand, thereby reducing the amount of energy required to form the proppant.

In this embodiment, the isocyanate is mixed with the catalyst to form a reaction mixture. Particularly suitable isocyanates include, but are not limited to, LUPRANATE® M20, LUPRANATE® M, and mixtures thereof. A particularly suitable catalyst is 3-methyl-1-phenyl-2-phospholene oxide. The reaction mixture is heated and a polycarbodiimide coating is formed. A reaction time of the reaction mixture depends on a temperature at which the reaction mixture is held, pressure, and an amount of catalyst in the reaction mixture. As the reaction time progresses, the formation of the polycarbodiimide coating proceeds and a molecular weight and a viscosity of the polycarbodiimide coating increases. After the reaction time, a mixture of the forming polycarbodiimide coating, additional isocyanate and catalyst, in a molten state, is cooled. This mixture solidifies at ambient temperature. Typically, the mixture of the polycarbodiimide coating, the isocyanate and the catalyst, now in a solidified, crystalline state, is processed into various sizes and/or powderized. The mixture of the polycarbodiimide coating, the isocyanate, and the catalyst, now a thermoplastic-like solid may be applied to the particle. The mixture of the polycarbodiimide coating, the isocyanate and the catalyst is applied to the particle, e.g. mixed with the particle, and heated for a predetermined amount of time at a temperature greater than 100° C., to form the proppant comprising the polycarbodiimide coating disposed on the particle.

As indicated above, the polycarbodiimide coating is typically formed by reacting an isocyanate, or isocyanates, in the presence of a catalyst. However, it is to be understood that the polycarbodiimide coating can be formed from other reactants which are not isocyanates. As just one example, the polycarbodiimide coating of this invention can be formed with ureas, e.g. thioureas, as reactants. Other examples of reactants suitable for formation of polycarbodiimide are described in "Chemistry and Technology of Carbodiimides", Henri Ulrich, John Wiley &Sons, Ltd., Chichester, West Sussex, England (2007), the disclosure of which is hereby incorporated by reference in its entirety.

In another embodiment, the coating is a formaldehyde-based coating. Formaldehyde-based coatings are typically selected for applications requiring excellent hardness. Formaldehyde-based coatings may be further selected from the group of phenol-aldehyde resole coatings, phenol-aldehyde novolac polymer-containing coatings, furan coatings, melamine-formaldehyde coatings, urea-formaldehyde coatings, and combinations thereof.

In one embodiment, the formaldehyde-based coating is a phenol-aldehyde resole coating. The phenol-aldehyde resole coating typically includes a reaction product of a phenol, an aldehyde, and an aliphatic hydroxy compound containing two or more hydroxy groups per molecule. Examples of suitable phenols include any phenols known in the art which may be used in the formation of phenolic coatings, including substituted phenols and unsubstituted phenol. Suitable substituted phenols include, but are not limited to, alkyl-substituted phenols, aryl-substituted phenols, cycloakyl-substituted phenols, alkenyl-substituted phenols, alkoxy-substituted phenols, aryloxy-substituted phenols, and halogen-substituted phenols.

Examples of suitable aldehydes for the purposes of the subject invention include, but are not limited to, formaldehyde, acetaldehyde, propionaldehyde, furfural, benzaldehyde, and formaldehyde. Suitable aldehydes typically contain from 1 to 8 carbon atoms. Typically, the aldehyde is formaldehyde.

Examples of aliphatic hydroxy compounds containing two or more hydroxy groups per molecule have a hydroxyl number of from 200 to 1,850 mg KOH/g. Suitable aliphatic hydroxyl compounds include ethylene glycol, propylene glycol, 1,3-propanediol, diethylene glycol, triethylene glycol, glycerol, sorbitol, and polyether polyols having hydroxyl numbers greater than about 200. Typically, the aliphatic hydroxy compound is glycerol.

A molar excess of aldehyde per mole of phenol is typically used to prepare the phenol-aldehyde resole coating. The phenol-aldehyde resole coating typically has a phenol to aldehyde molar ratio from about 1:1 to about 1:3, more typically from about 1:1 to about 1:1.95.

In another embodiment, the formaldehyde-based coating is a phenol-aldehyde novolac polymer-containing coating. The phenol-aldehyde novolac polymer-containing coating typically includes a reaction product of a phenolic compound and an aldehyde in the presence of an acid catalyst. Suitable phenolic compounds include any of the phenols set forth above. Suitable aldehydes include any known in the art, including, but not limited to, formalin, paraformaldehyde, formaldehyde, acetaldehyde, furfural, and benzaldehyde. Typically, the aldehyde is formaldehyde. Suitable acid catalysts include strong mineral acids such as sulfuric acid, phosphoric acid, and hydrochloric acid, and organic acids such as oxalic acid and para toluenesulfonic acid. The phenol-aldehyde novolac polymer-containing coating typically has a phenol to aldehyde molar ratio from about 1:0.85 to about 1:0.4.

In another embodiment, the formaldehyde-based coating is a furan coating. The furan coating typically includes a reaction product of urea formaldehyde and furfuryl alcohol; urea formaldehyde, phenol formaldehyde, and furfuryl alcohol; phenol formaldehyde and furfuryl alcohol; or formaldehyde and furfuryl alcohol. Typically, the furan coating includes the reaction product of urea formaldehyde and furfuryl alcohol.

In another embodiment, the formaldehyde-based coating is a melamine-formaldehyde coating. The melamine-formaldehyde coating typically includes a reaction product of a resole and a melamine. Suitable resoles and melamines include any known in the art.

In another embodiment, the formaldehyde-based coating is a urea-formaldehyde coating. The urea-formaldehyde coating includes a reaction product of a urea monomer and a formaldehyde monomer. Suitable urea monomers and formaldehyde monomers include any known in the art. Typically, the urea monomer and the formaldehyde monomer are reacted at a mole ratio of formaldehyde to urea of from about 1.1:1 to about 4:1, more typically of from about 2.1:1 to 3.2:1.

The coating may also be further defined as controlled-release. That is, the coating may systematically dissolve and/or hydrolyze in a controlled manner to expose the particle to the petroleum fuels in the subsurface reservoir. The coating typically gradually dissolves in a consistent manner over a pre-determined time period to decrease the thickness of the coating. This embodiment is especially useful for applications utilizing the active agent such as the microorganism and/or the catalyst. That is, the coating is typically controlled-release for applications requiring filtration of petroleum fuels or water.

In any embodiment involving cross-linking with an isocyanate component, for example in embodiments including the polyurethane coating, the polycarbodiimide coating, or the polyurea coating, the coating typically exhibits excellent non-wettability in the presence of water, as measured in accordance with standard contact angle measurement methods known in the art. The coating typically has a contact angle of greater than 90° and may be categorized as hydrophobic. Consequently, the proppant of such an embodiment typically partially floats in the subsurface reservoir and is typically useful for applications requiring foam coatings.

The coating of this invention can be cross-linked where it is cured prior to pumping of the proppant into the subsurface reservoir, or the coating can be curable whereby the coating cures in the subsurface reservoir due to the conditions inherent therein. These concepts are described further below.

The proppant of the subject invention may comprise the particle encapsulated with a cross-linked coating. The cross-linked coating typically provides crush strength, or resistance, for the proppant and prevents agglomeration of the proppant. Since the cross-linked coating is cured before the proppant is pumped into a subsurface reservoir, the proppant typically does not crush or agglomerate even under high pressure and temperature conditions.

Alternatively, the proppant of the subject invention may comprise the particle encapsulated with a curable coating. The curable coating typically consolidates and cures subsurface. The curable coating is typically not cross-linked, i.e., cured, before the proppant is pumped into the subsurface reservoir. Instead, the curable coating typically cures under the high pressure and temperature conditions in the subsurface reservoir. Proppants comprising the particle encapsulated with the curable coating are often used for high pressure and temperature conditions.

Additionally, proppants comprising the particle encapsulated with the curable coating may be classified as curable proppants, subsurface-curable proppants and partially-curable proppants. Subsurface-curable proppants typically cure entirely in the subsurface reservoir, while partially-curable proppants are typically partially cured before being pumped into the subsurface reservoir. The partially-curable proppants then typically fully cure in the subsurface reservoir. The proppant of the subject invention can be either subsurface-curable or partially-curable.

Multiple layers of the coating can be applied to the particle to form the proppant. As such, the proppant of the subject invention can comprise a particle having a cross-linked coating disposed on the particle and a curable coating disposed on the crosslinked coating, and vice versa.

The proppant may further include a silicon-containing adhesion promoter. This adhesion promoter is also commonly referred to in the art as a coupling agent or as a binder agent. The adhesion promoter binds the coating to the particle. More specifically, the adhesion promoter typically has organofunctional silane groups to improve adhesion of the coating to the particle. Without being bound by theory, it is thought that the adhesion promoter allows for covalent bonding between the particle and the coating. In one embodiment, the surface of the particle is activated with the adhesion promoter by applying the adhesion promoter to the particle prior to coating the particle with the coating. In this embodiment, the adhesion promoter can be applied to the particle by a wide variety of application techniques including, but not limited to, spraying, dipping the particles in the coating, etc. In another embodiment, the adhesion promoter may be incorporated into the coating. As such, the particle is then simply exposed to the adhesion promoter when the coating is applied to the particle. The adhesion promoter is useful for applications requiring excellent adhesion of the coating to the particle, for example, in applications where the proppant is subjected to shear forces in an aqueous environment. Use of the adhesion promoter provides adhesion of the coating to the particle such that the coating will remain adhered to the surface of the particle even if the proppant, including the coating, the particle, or both, fractures due to closure stress.

Examples of suitable adhesions promoters, which are silicon-containing, include, but are not limited to, glycidoxypropyltrimethoxysilane, amino ethylaminopropyltrimethoxysilane, methacryloxypropyltrimethoxysilane, gamma-aminopropyltriethoxysilane, vinylbenzylaminoethylaminopropyltrimethoxysilane, glycidoxypropylmethyldiethoxysilane, chloropropyltrimethoxysilane, phenyltrimethoxysilane, vinyltriethoxysilane, tetraethoxysilane, methyldimethoxysilane, bis-triethoxysilylpropyldisulfidosilane, bis-triethoxysilylpropyltetrasulfidosilane, phenyltriethoxysilane, aminosilanes, and combinations thereof.

Specific examples of suitable adhesion promoters include, but are not limited to, Silquest™ A1100, Silquest™ A1110, Silquest™ A1120, Silquest™ 1130, Silquest™ A1170, Silquest™ A-189, and Silquest™ Y9669, all commercially available from Momentive Performance Materials of Albany, N.Y. A particularly suitable silicon-containing wetting agent is Silquest™ A1100, i.e., gamma-aminopropyltriethoxysilane. The silicon-containing wetting agent may be present in the proppant in an amount of from about 0.001 to about 10, typically from about 0.01 to about 7.5, and more typically from about 0.1 to about 5, percent by weight, based on 100 parts by weight of the polycarbodiimide coating.

The coating in this invention may also include the active agent already described above in the context of the particle. In other words, the active agent may be included in the coating independent of the particle. Once again, suitable active agents include, but are not limited to organic compounds, microorganisms, and catalysts. The coating may include other additives, active or otherwise, such as wetting agents, surfactants, and the like.

The proppant of the subject invention typically exhibits excellent thermal stability for high temperature and pressure applications, e.g. temperatures greater than 100° C., typically greater than 250° C., more typically greater than 350° C., and even more typically greater than 500° C., and/or pressures (independent of the temperatures described above) greater than 7,500 psi, typically greater than 10,000 psi, more typically greater than 12,500 psi, and even more typically greater than 15,000 psi. The proppant of this invention does not suffer from complete failure of the coating due to shear or degradation when exposed to such temperatures and pressures.

Further, with the coating of this invention, the proppant typically exhibits excellent crush strength, also commonly referred to as crush resistance. With this crush strength, the coating of the proppant is uniform and is substantially free from defects, such as gaps or indentations, which often contribute to premature breakdown and/or failure of the coating. In particular, the proppant exhibits a crush strength of 15% or less maximum fines as measured in accordance with American Petroleum Institute (API) RP60 at pressures ranging from 7500 to 15000 psi, including at specific stress pressures of 7500, 10000, 12500, and 15000 psi. When 20/40 Arizona sand is utilized as the particle, a preferred crush strength associated with the proppant of this invention is 10% or less, more preferred 5% or less, maximum fines as measured in accordance with API RP60 at the same stress pressure range and specific stress pressures described above. When 40/70 Ottawa sand is utilized as the particle, a preferred crush strength associated with the proppant of this invention is 8% or less, more preferred 5% or less, maximum fines as measured in accordance with API RP60 at the same stress pressure range and specific stress pressures described above. The most typical crush strength of this proppant is 2% or less maximum fines as measured in accordance with API RP60 at 8000 psi and 10000 psi. The coating of this invention typically provides a cushioning effect for the proppant and evenly distributes high pressures, e.g. closure stresses, around the proppant. Therefore, the proppant of the subject invention effectively props open fractures and minimizes unwanted impurities in unrefined petroleum fuels in the form of dust particles.

Although customizable according to carrier fluid selection, the proppant typically has a specific gravity of from 0.1 to 3.0, more typically from 1.0 to 2.0. One skilled in the art typically selects the specific gravity of the proppant according to the specific gravity of the carrier fluid and whether it is desired that the proppant be lightweight or substantially neutrally buoyant in the selected carrier fluid. In particular, it is desired that the specific gravity of the proppant is less than the specific gravity of the carrier fluid to minimize proppant settling in the carrier fluid. Further, based on the non-wettability of the coating including isocyanate cross-links as set forth above, the proppant of such an embodiment typically has an apparent density, i.e., a mass per unit volume of bulk proppant, also known as bulk density, of from 2.0 to 3.0, more typically from 2.3 to 2.7, g/cm$^3$ according to API Recommended Practices RP60 for testing proppants. It is believed that the non-wettability of the coating may contribute to flotation of the proppant depending on the selection of the carrier fluid in the wellbore.

Further, the proppant typically minimizes unpredictable consolidation. That is, the proppant only consolidates, if at all, in a predictable, desired manner according to carrier fluid selection and operating temperatures and pressures. Also, the proppant is typically compatible with low-viscosity carrier fluids having viscosities of less than about 3,000 cps at 80° C. and is typically substantially free from mechanical failure and/or chemical degradation when exposed to the carrier fluids and high pressures. Finally, the proppant is typically coated via economical coating processes and typically does not require multiple coating layers, and therefore minimizes production costs.

As set forth above, the subject invention also provides the method of forming, or preparing, the proppant. For this method, the particle and the coating, preferably the polycarbodiimide coating, are provided, and the particle is coated with the polycarbodiimide coating. The step of coating the particle with the polycarbodiimide coating is described additionally below.

To provide the polycarbodiimide coating, the isocyanate is reacted, typically in the presence of the catalyst. Reacting the isocyanate forms the forms the polycarbodiimide coating. As indicated in certain embodiments below, the isocyanate may be reacted to form the polycarbodiimide coating prior to the actual coating of the particle; alternatively, the isocyanate may be reacted to form the polycarbodiimide coating simultaneous with the actual coating of the particle.

As with all other components which may be used in the method of the subject invention (e.g. the particle), the isocyanate and catalyst are just as described above with respect to the polycarbodiimide coating. The isocyanate is preferably the reaction product of the first and second isocyanates described above where the first and second isocyanates are preferably further defined as a polymeric isocyanate and a monomeric isocyanate, respectively. Furthermore, as described above, the preferred polymeric and monomeric isocyanate are reacted in a weight ratio of 4:1 to 1:4, more typically 2.5:1 to 1:1, and even more typically 2.0:1, to form the polycarbodiimide coating.

The particle is coated with the polycarbodiimide coating to form the proppant. The polycarbodiimide coating is applied to the particle to coat the particle. The particle may optionally be heated to a temperature greater than 150° C. prior to or simultaneous with the step of coating the particle with the polycarbodiimide coating. A preferred temperature range for heating the particle is 150-180° C. Heating the particle brings the temperature of the particle closer to a temperature at which the components can react to form the polycarbodiimide coating.

Various techniques can be used to coat the particle with the polycarbodiimide coating. These techniques include, but are not limited to, mixing, pan coating, fluidized-bed coating, co-extrusion, spraying, in-situ formation of the coating, and spinning disk encapsulation. The technique for applying the coating to the particle is selected according to cost, production efficiencies, and batch size.

In this method, the step of reacting the isocyanate in the presence of the catalyst to form the polycarbodiimide coating and the step of coating the particle with the polycarbodiimide coating are collectively conducted in 20 minutes or less, typically in 10 minutes or less, more typically in 6 minutes or less, and even more typically in 3 to 5 minutes.

Once coated, the proppant can be heated to further crosslink the polycarbodiimide coating. Where the proppant is heated to further crosslink the polycarbodiimide coating, the step of reacting the isocyanate to form the polycarbodiimide coating, the step of coating the particle with the polycarbodiimide coating, and of the step of heating the proppant to further crosslink the polycarbodiimide coating are collectively conducted in 30 minutes or less, typically in 20 minutes or less, more typically in 10 minutes or less, and even more typically in 6 minutes or less.

In one embodiment, the coating is disposed on the particle via mixing in a vessel, e.g. a reactor. In particular, the individual components of the coating, e.g. the isocyanate, the particle, and optionally the catalyst, are added to the vessel to form a reaction mixture. The components may be added in equal or unequal weight ratios. The reaction mixture is typically agitated at an agitator speed commensurate with the viscosities of the components. Further, the reaction mixture is typically heated at a temperature commensurate with the coating technology and batch size. For example, the components of the coating are typically heated from a temperature of about 70° C. to a temperature of about 130° C. in 10 minutes or less, depending on batch size. It is to be appreciated that the technique of mixing may include adding components to the vessel sequentially or concurrently. Also, the components may be added to the vessel at various time intervals and/or temperatures.

In another embodiment, the coating is disposed on the particle via spraying. In particular, individual components of the coating are contacted in a spray device to form a coating mixture. The coating mixture is then sprayed onto the particle to form the proppant. Spraying the coating onto the particle results in a uniform, complete, and defect-free coating disposed on the particle. For example, the coating is typically even and unbroken. The coating also typically has adequate thickness and acceptable integrity, which allows for applications requiring controlled-release of the proppant in the fracture. Spraying also typically results in a thinner and more consistent coating disposed on the particle as compared to other techniques, and thus the proppant is coated economically. Spraying the particle even permits a continuous manufacturing process. Spray temperature is typically selected by one known in the art according to coating technology and ambient humidity conditions. The particle may also be heated to induce curing of the coating. Further, one skilled in the art typically sprays the components at a viscosity commensurate with the viscosity of the components.

In another embodiment, the coating is disposed on the particle in-situ, i.e., in a reaction mixture comprising the components of the coating and the particle. In this embodiment, the coating is formed or partially formed as the coating is disposed on the particle. In-situ coating formation steps typically include providing each component of the coating, providing the particle, combining the components of the coating and the particle, and disposing the coating on the particle. In-situ formation of the coating typically allows for reduced production costs by way of fewer processing steps as compared to existing methods for forming a proppant.

The formed proppant is typically prepared according to the method as set forth above and stored in an offsite location before being pumped into the subterranean formation and the subsurface reservoir. As such, spraying typically occurs offsite from the subterranean formation and subsurface reservoir. However, it is to be appreciated that the proppant may also be prepared just prior to being pumped into the subterranean formation and the subsurface reservoir. In this scenario, the proppant may be prepared with a portable coating apparatus at an onsite location of the subterranean formation and subsurface reservoir.

The proppant is useful for hydraulic fracturing of the subterranean formation to enhance recovery of petroleum and the like. In a typical hydraulic fracturing operation, a hydraulic fracturing composition, i.e., a mixture, comprising the carrier fluid, the proppant, and optionally various other components, is prepared. The carrier fluid is selected according to wellbore conditions and is mixed with the proppant to form the mixture which is the hydraulic fracturing composition. The carrier fluid can be a wide variety of fluids including, but not limited to, kerosene and water. Typically, the carrier fluid is water. Various other components which can be added to the mixture include, but are not limited to, guar, polysaccharides, and other components know to those skilled in the art.

The mixture is pumped into the subsurface reservoir, which may be the wellbore, to cause the subterranean formation to fracture. More specifically, hydraulic pressure is applied to introduce the hydraulic fracturing composition under pressure into the subsurface reservoir to create or enlarge fractures in the subterranean formation. When the hydraulic pressure is released, the proppant holds the fractures open, thereby enhancing the ability of the fractures to extract petroleum fuels or other fluids from the subsurface reservoir to the wellbore.

For the method of filtering a fluid, the proppant of the subject invention is provided according to the method of forming the proppant as set forth above. In one embodiment, the fluid can be an unrefined petroleum or the like. However, it is to be appreciated that the method of the subject invention may include the filtering of other fluids not specifically recited herein, for example, air, water, or natural gas.

To filter the fluid, the fracture in the subsurface reservoir that contains the unrefined petroleum, e.g. unfiltered crude oil, is identified by methods known in the art of oil extraction. Unrefined petroleum is typically procured via a subsurface reservoir, such as a wellbore, and provided as feedstock to refineries for production of refined products such as petroleum gas, naphtha, gasoline, kerosene, gas oil, lubricating oil, heavy gas, and coke. However, crude oil that resides in subsurface reservoirs includes impurities such as sulfur, undesirable metal ions, tar, and high molecular weight hydrocarbons. Such impurities foul refinery equipment and lengthen refinery production cycles, and it is desirable to minimize such impurities to prevent breakdown of refinery equipment, minimize downtime of refinery equipment for maintenance and cleaning, and maximize efficiency of refinery processes. Therefore, filtering is desirable.

For the method of filtering, the hydraulic fracturing composition is pumped into the subsurface reservoir so that the hydraulic fracturing composition contacts the unfiltered crude oil. The hydraulic fracturing composition is typically pumped into the subsurface reservoir at a rate and pressure such that one or more fractures are formed in the subterranean formation. The pressure inside the fracture in the subterranean formation may be greater than 5,000, greater than 7,000, or even greater than 10,000 psi, and the temperature inside the fracture is typically greater than 70° F. and can be as high 375° F. depending on the particular subterranean formation and/or subsurface reservoir.

Although not required for filtering, it is particularly desirable that the proppant be a controlled-release proppant. With a controlled-release proppant, while the hydraulic fracturing composition is inside the fracture, the coating of the proppant typically dissolves in a controlled manner due to pressure, temperature, pH change, and/or dissolution in the carrier fluid in a controlled manner, i.e., a controlled-release. Complete dissolution of the coating depends on the thickness of the coating and the temperature and pressure inside the fracture, but typically occurs within 1 to 4 hours. It is to be understood that the terminology "complete dissolution" generally means that less than 1% of the coating remains disposed on or about the particle. The controlled-release allows a delayed exposure of the particle to crude oil in the fracture. In the embodiment where the particle includes the active agent, such as the microorganism or catalyst, the particle typically has reactive sites that must contact the fluid, e.g. the crude oil, in a controlled manner to filter or otherwise clean the fluid. If implemented, the controlled-release provides a gradual exposure of the reactive sites to the crude oil to protect the active sites from saturation. Similarly, the active agent is typically sensitive to immediate contact with free oxygen. The controlled-release provides the gradual exposure of the active agent to the crude oil to protect the active agent from saturation by free oxygen, especially when the active agent is a microorganism or catalyst.

To filter the fluid, the particle, which is substantially free of the coating after the controlled-release, contacts the fluid, e.g. the crude oil. It is to be understood that the terminology "substantially free" means that complete dissolution of the coating has occurred and, as defined above, less than 1% of the coating remains disposed on or about the particle. This terminology is commonly used interchangeably with the terminology "complete dissolution" as described above. In an embodiment where an active agent is utilized, upon contact with the fluid, the particle typically filters impurities such as sulfur, unwanted metal ions, tar, and high molecular weight hydrocarbons from the crude oil through biological digestion. As noted above, a combination of sands/sintered ceramic particles and microorganisms/catalysts are particularly useful for filtering crude oil to provide adequate support/propping and also to filter, i.e., to remove impurities. The proppant therefore typically filters crude oil by allowing the delayed exposure of the particle to the crude oil in the fracture.

The filtered crude oil is typically extracted from the subsurface reservoir via the fracture, or fractures, in the subterranean formation through methods known in the art of oil extraction. The filtered crude oil is typically provided to oil refineries as feedstock, and the particle typically remains in the fracture.

Alternatively, in a fracture that is nearing its end-of-life, e.g. a fracture that contains crude oil that cannot be economically extracted by current oil extraction methods, the particle may also be used to extract natural gas as the fluid from the fracture. The particle, particularly where an active agent is utilized, digests hydrocarbons by contacting the reactive sites of the particle and/or of the active agent with the fluid to convert the hydrocarbons in the fluid into propane or methane. The propane or methane is then typically harvested from the fracture in the subsurface reservoir through methods known in the art of natural gas extraction.

EXAMPLES

The following examples, illustrating the proppant of this invention, are intended to illustrate and not limit the invention.

Example 1

Example 1 is a proppant formed according to the subject invention. To form Example 1, a polycarbodiimide coating is disposed on a particle, specifically on an outer periphery of the particle. Example 1 is compared to a comparative proppant, Comparative Example 1.

The composition of Example 1 is disclosed below in Table 1. To form Example 1, Isocyanate A and Catalyst A are mixed to form a reaction mixture. The reaction mixture, as well as Particle A, are added to a reaction vessel and agitated at a temperature of 160° C. for 20 minutes to polymerize Isocyanate A. During agitation at these conditions, the polymerized Isocyanate A forms a polycarbodiimide coating on Particle A. Next, Particle A having the polycarbodiimide coating formed thereon is heated, i.e., post-cured, at a temperature of 200° C. for 45 minutes to cure the polycarbodiimide coating, whereby crystallinity and hardness are built. As such, Example 1 is a proppant that comprises Particle A and the polycarbodiimide coating formed thereon.

Example 1 is described below in Table 1. The amounts in Table 1 are in grams.

TABLE 1

| | Example 1 |
|---|---|
| Isocyanate A | 15.79 |
| Catalyst A | 0.78 |
| Particle A | 300 |

Isocyanate A is LUPRANATE ® MI, an isocyanate sold under the trademark LUPRANATE ®.
Catalyst A is 95 parts by weight gamma butyrolactone and 5 parts by weight 3-methyl-1-phenyl-2-phospholene oxide.
Particle A is 20/40 Arizona sand.

Comparative Example 1 is untreated 20/40 Arizona sand proppant.

Example 1 and Comparative Example 1 are tested for crush strength and for thermal properties. Example 1 is tested for crush strength according to API RP60, and Comparative Example 1 is tested for crush strength according to API RP56. The appropriate formula for determining percent fines is set forth in API RP60 and RP56. The thermal properties of Example 1 and Comparative Example 1 are also tested via thermal gravimetric analysis (TGA).

Example 1 has 4.7% fines after crush strength testing at 10,000 psi. In contrast, Comparative Example 1 has 27% fines after crush strength testing at 10,000 psi. As such, the crush strength of Example 1 is significantly higher than that of Comparative Example 1. Example 1 exhibits excellent thermal stability when tested via TGA. Example 1 is thermally stable at temperatures exceeding 500° C.

Examples 2-17

Examples 2-17 are also proppants formed according to the subject invention. Examples 2-17 are formed with the components disclosed in Table 2. Examples 2-17 are proppants comprising a polycarbodiimide coating disposed on Particle A. Particle A is activated with Adhesion Promoter A by pre-coating Particle A with Adhesion Promoter A prior to coating with the polycarbodiimide coating. If an isocyanate of a given Example comprises a mixture of isocyanates, the mixture of isocyanates is mixed thoroughly. To form Examples 2-17, the isocyanate and Catalyst A are added to a reaction vessel to form a reaction mixture and the reaction mixture is mixed and heated to 110° C. for 5 minutes. Next, Particle A is added to the reaction vessel and agitated, with the reaction mixture, at a temperature of approximately 123° C. (approximately 250° F.) for 6 minutes to (1) uniformly coat the surface of Particle A with the reaction mixture and (2) polymerize the particular isocyanate or isocyanates. Once the isocyanate or isocyanates are polymerized, the reaction mixture forms a polycarbodiimide coating on Particle A. As such, Examples 2-17 are proppants comprising Particle A and the polycarbodiimide coating formed thereon. The proppants of Examples 2-15 are heated, i.e., post-cured, at a temperature of 195° C. for 3 hours to further cure the polycarbodiimide coating. The proppants of Examples 16 and 17 are heated, i.e., post-cured, at a temperature of 150° C. for 3 hours to further cure the polycarbodiimide coating. Table 2 below sets forth descriptions of Examples 2-17 as well as test results. Referring now to Table 2:

the amounts of Isocyanates A through E are in percent by weight of the isocyanate based on a total combined weight of the isocyanates;

the amounts of the Coating, under the heading Coating Amt, are in percent by weight of the polycarbodiimide coating based on the percent by weight of Particle A, and the amounts of Adhesion Promoter A are in percent by weight of the adhesion promoter based on the weight of the polycarbodiimide coating.

TABLE 2

| Ex | Iso. B Amt | Iso. C Amt | Iso. D Amt | Iso. E Amt | Iso. A Amt | Coating Amt | Adhesion Promoter A Amt | % Fines | Agglomeration | Comments |
|---|---|---|---|---|---|---|---|---|---|---|
| 2 | 100 | — | — | — | — | 4 | 5 | 3.4 | 1 | all fell out upon flip |
| 3 | — | — | 100 | — | — | 4 | 5 | 3.3 | 1 | all fell out upon flip |
| 4 | 80 | 20 | — | — | — | 5 | 5 | 7.8 | 1 | all fell out upon flip |
| 5 | 80 | 20 | — | — | — | 5 | 5 | 7.5 | 2 | some fell out of cylinder and rest could easily be broken up with tool |
| 6 | 72.5 | 27.5 | — | — | — | 5 | 5 | 5.7 | 2 | a portion of the material fell out of the cell, the remaining could easily be moved with a tool |
| 7 | 70 | 30 | — | — | — | 5 | 5 | 5.7 | 2 | fell freely from cell and remaining could be loosed with some pats on the backside |
| 8 | 65 | 35 | — | — | — | 4 | 2.5 | 2.2 | 1 | all fell out upon flip |
| 9 | 65 | 35 | — | — | — | 4 | 5 | 2.1 | 1 | all fell out upon flip |
| 10 | 65 | 35 | — | — | — | 5 | 5 | 7.8 | 2 | a portion of the material fell out of the cell, the remaining could easily be moved with a tool |
| 11 | 60 | 40 | — | — | — | 5 | 5 | 4.2 | 2 | fell freely from cell and remaining could be loosed with some pats on the backside |
| 12 | 57.5 | 42.5 | — | — | — | 5 | 5 | 6.1 | 2 | a portion of the material fell out of the cell, the remaining could easily be moved with a tool |
| 13 | 50 | 50 | — | — | — | 5 | 5 | 3.7 | 2 | fell freely from cell and remaining could be loosed with some pats on the backside |

TABLE 2-continued

| Ex | Iso. B Amt | Iso. C Amt | Iso. D Amt | Iso. E Amt | Iso. A Amt | Coating Amt | Adhesion Promoter A Amt | % Fines | Agglom- eration | Comments |
|---|---|---|---|---|---|---|---|---|---|---|
| 14 | 50 | 50 | — | — | — | 5 | 5 | 5 | 4 | agglomerated some, but could get apart with some effort with tool |
| 15 | 20 | 80 | — | — | — | 5 | 5 | 3.4 | 5 | agglomerated some, but could get apart with some effort with tool |
| 16 | — | — | — | 100 | — | 5 | 5 | 7.3 | — | |
| 17 | — | — | — | — | 100 | 5 | 5 | 4.7 | — | |

Isocyanate B is LUPRANATE ® M20, an isocyanate sold under the trademark LUPRANATE ®.
Isocyanate C is LUPRANATE ® M, an isocyanate sold under the trademark LUPRANATE ®.
Isocyanate D is LUPRANATE ® M70, an isocyanate sold under the trademark LUPRANATE ®.
Isocyanate E is LUPRANATE ® L5120, an isocyanate sold under the trademark LUPRANATE ®.
Adhesion Promoter A is SILQUEST ™ A1100, gamma-aminopropyltriethoxysilane sold under the trademark SILQUEST ™.

The crush strength of Examples 2 through 17 is tested by compressing a proppant sample, which weighs 9.4 grams, in a test cylinder for 1 hour at 9000 PSI and 123° C. After compression, percent fines and agglomeration are determined.

Agglomeration is an objective observation of a proppant sample, i.e., a particular Example, after crush strength testing as described above. The proppant sample is assigned a numerical ranking between 1 and 10. If the proppant sample agglomerates completely, it is ranked 10. If the proppant sample does not agglomerate, i.e., it falls out of the cylinder after crush test, it is rated 1. Generally, at least some agglomeration is preferred.

Referring to Table 2, comments made after the crush strength testing generally describing the proppant sample are disclosed. The comments are observations as to how tightly packed the proppant sample is in the test cylinder and how readily the proppant sample falls out of the test cylinder.

Examples 18 and 19

Examples 18 and 19 are also proppants formed according to the subject invention. To form Examples 18 and 19, an isocyanate and Catalyst A are mixed to form a reaction mixture. More specifically, 140 g of the isocyanate are mixed with a quantity of Catalyst A such that 500 ppm 3-methyl-1-phenyl-2-phospholene oxide is included in the reaction mixture. The particular isocyanates and the amounts used are disclosed in Table 3. The reaction mixture is heated at 105° C. for 60 minutes and a polycarbodiimide coating is formed. The polycarbodiimide coating, in a molten state, is cooled to a solidified, thermoplastic-like, crystalline state and is powderized.

The isocyanates of Examples 18 and 19 are described below in Table 3. The amounts in Table 3 are in percent by weight based on a total combined weight of the isocyanates.

TABLE 3

| | Example 18 | Example 19 |
|---|---|---|
| Isocyanate B | 0% | 65% |
| Isocyanate C | 100% | 35% |

Particle A is activated with Adhesion Promoter A by pre-coating Particle A with Adhesion Promoter A prior to coating with the polycarbodiimide coating. More specifically, Particle A is pre-coated with 0.25 percent by weight Adhesion Promoter A, based on 100 parts by weight of the Particle A. The polycarbodiimide coating and the Particle A are added to a reaction vessel in a weight ratio of 1:20, which is 5 percent polycarbodiimide coating based on 100 parts by weight of the Particle A, and agitated at a temperature greater than 110° C. to form the proppants Examples 18 and 19.

Examples 18 and 19 are crush tested and the results of these tests are acceptable. In addition, the polycarbodiimide coating of Example 19 is tested for free NCO initially and after one month storage at ambient temperatures, under nitrogen, in an environment substantially free of water. The free NCO of Example 19 is 14.58% initially, while one month later the free NCO is 13.05%. The free NCO results indicate that the polycarbodiimide coating is stable when stored at ambient temperature in an inert environment substantially free of water. With such stability, the proppant of Example 19 can be formed at least one month after the polycarbodiimide coating is formed. In other words, the polycarbodiimide coating remains stable and can be applied to the particle to form the proppant at least one month after the polycarbodiimide coating is formed.

Examples 20-22

Examples 20-22 are also proppants formed according to the subject invention. Examples 20-22 are formed with the components disclosed in Table 4. Examples 20-22 are proppants comprising Particle B and the polycarbodiimide coating formed thereon. To form examples 20-22, Particle B is activated with Adhesion Promoter A by pre-coating Particle B with Adhesion Promoter A prior to coating Particle B with the polycarbodiimide coating. Particle B is heated to a temperature of 170° C. Isocyanate B, Isocyanate C, and Catalyst A are mixed to form a reaction mixture at ambient temperatures. Next, Particle B, at a temperature of 170° C., and the reaction mixture are added to a reaction vessel and agitated for 2 minutes to form the proppants of Examples 20-22. During agitation, a silicone mold release is sprayed on the proppant to further ensure that the proppant does not agglomerate. Following agitation, the proppant is heated to a temperature of 170° C. for 8 minutes. As such, Examples 20-22 are formed in 10 minutes.

Examples 20-22 are described below in Table 4. The amounts in Table 4 are in grams.

TABLE 4

|  | Example 20 | Example 21 | Example 22 |
|---|---|---|---|
| Isocyanate B | 5.229 | 4.482 | 2.265 |
| Isocyanate C | 2.241 | 2.988 | 2.625 |
| Catalyst A | 0.075 | 0.075 | 0.075 |
| Partice B | 200 | 200 | 141 |
| Adhesion Promoter A | .08 | .08 | .056 |

Particle B is 40/70 Ottawa sand. The other components are as set forth above.

Examples 20-22 are tested for crush strength at 10,000 psi and 250° F. Percent fines and agglomeration are determined. After crush strength testing Example 20 has 1.9% fines and an agglomeration of 2 according the ranking described above, Example 21 has 0.9% fines and an agglomeration of 3, and Example 22 has 1.7% fines and an agglomeration of 4.5. As such, Examples 20-22 demonstrate excellent crush strength over a range of agglomerations.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

What is claimed is:

1. A proppant for hydraulically fracturing a subterranean formation, said proppant comprising:
   A. a particle comprising sand or ceramic; and
   B. a polycarbodiimide coating disposed on said particle and comprising the reaction product of a polymeric isocyanate comprising a polymeric diphenylmethane diisocyanate and a monomeric isocyanate comprising 4,4'-diphenylmethane diisocyanate in the presence of a catalyst, said coating present in an amount of from about 0.1 to about 10 percent by weight, based on 100 parts by weight of said particle.

2. The proppant as set forth in claim 1, wherein said polymeric isocyanate and said monomeric isocyanate react in a weight ratio of 2.5:1 to 1:1 to form said polycarbodiimide coating.

3. The proppant as set forth in claim 1, wherein said polymeric isocyanate has an NCO content of about 31.5 weight percent.

4. The proppant as set forth in claim 1, wherein said monomeric isocyanate has an NCO content of about 33.5 weight percent.

5. The proppant as set forth in claim 1, wherein said polycarbodiimide coating is present in said proppant in an amount of from about 0.5 to about 7.5 percent by weight, based on 100 parts by weight of said particle.

6. The proppant as set forth in claim 1, which is thermally stable at temperatures greater than 100° C.

7. A method of forming a proppant for hydraulically fracturing a subterranean formation, said method comprising the steps of:
   A. providing a particle comprising sand or ceramic;
   B. providing a polymeric isocyanate comprising a polymeric diphenylmethane diisocyanate and a monomeric isocyanate comprising 4,4'-diphenylmethane diisocyanate;
   C. reacting the polymeric diphenylmethane diisocyanate and the monomeric isocyanate comprising 4,4'-diphenylmethane diisocyanate in the presence of a catalyst to form the polycarbodiimide coating; and
   D. coating the particle with the polycarbodiimide coating in an amount of from about 0.1 to about 10 percent by weight, based on 100 parts by weight of said particle.

8. The method as set forth in claim 7, wherein the first isocyanate is further defined as a polymeric isocyanate and the second isocyanate is further defined as a monomeric isocyanate, and the step of reacting the first and second isocyanates is further defined as reacting the polymeric isocyanate and the monomeric isocyanate in the presence of the catalyst to form the polycarbodiimide coating.

9. The method as set forth in claim 8, wherein the step of reacting the polymeric isocyanate and the monomeric isocyanate is further defined as reacting the polymeric isocyanate and the monomeric isocyanate in a weight ratio of 2.5:1 to 1:1 to form the polycarbodiimide coating.

10. The method as set forth in claim 8, wherein the polymeric isocyanate has an NCO content of about 31.5 weight percent, and the monomeric isocyanate has an NCO content of about 33.5 weight percent.

11. The method as set forth in claim 7 further comprising the step of heating the particle to a temperature greater than 150° C. prior to or simultaneous with the step of coating the particle with the polycarbodiimide coating.

12. The method as set forth in claim 7, wherein the steps of reacting the isocyanate in the presence of the catalyst to form the polycarbodiimide coating and of coating the particle with the polycarbodiimide coating are collectively conducted in 20 minutes or less.

13. The method as set forth in claim 7, wherein the step of reacting the isocyanate to form the polycarbodiimide coating is conducted prior to the step of coating the particle with the polycarbodiimide coating.

14. The method as set forth in claim 7 further comprising the step of heating the proppant to further crosslink the polycarbodiimide coating.

15. A method of hydraulically fracturing a subterranean formation which defines a subsurface reservoir with a mixture comprising a carrier fluid and a proppant, the proppant comprising a particle comprising sand or ceramic and a polycarbodiimide coating disposed on said particle and comprising the reaction product of a polymeric isocyanate comprising a polymeric diphenylmethane diisocyanate and a monomeric isocyanate comprising 4,4'-diphenylmethane diisocyanate in the presence of a catalyst, wherein the polycarbodiimide coating is present in an amount of from about 0.1 to about 10 percent by weight, based on 100 parts by weight of said particle, said method comprising the step of pumping the mixture into the subsurface reservoir to cause the subterranean formation to fracture.

16. The method as set forth in claim 15, wherein the polymeric isocyanate and the monomeric isocyanate react in a weight ratio of 2.5:1 to 1:1 to form the polycarbodiimide coating.

17. The method as set forth in claim 15, wherein the polymeric isocyanate has an NCO content of about 31.5 weight percent, and the monomeric isocyanate has an NCO content of about 33.5 weight percent.

18. A proppant for hydraulically fracturing a subterranean formation, said proppant comprising:
   A. a particle selected from the group consisting of minerals, ceramics, sands, nut shells, gravels, mine tailings, coal ashes, rocks, smelter slag, diatomaceous earth, crushed charcoals, micas, sawdust, wood chips, and combinations thereof; and B. a polycarbodiimide coating disposed on said particle and comprising the reaction product of a polymeric isocyanate comprising a polymeric diphenylmethane diisocyanate and a monomeric isocyanate comprising 4,4'-diphenylmethane diisocyanate in the presence of a catalyst, said coating present in an amount of from about 0.1 to about 10 percent by weight, based on 100 parts by weight of said particle.

19. The proppant as set forth in claim 18, wherein said particle has a particle size of from 149 to 2,000 μm.

* * * * *